Nov. 10, 1959
J. E. SMITH, JR
2,911,956
SHAFT POSITIONER
Filed Jan. 7, 1959
2 Sheets-Sheet 1
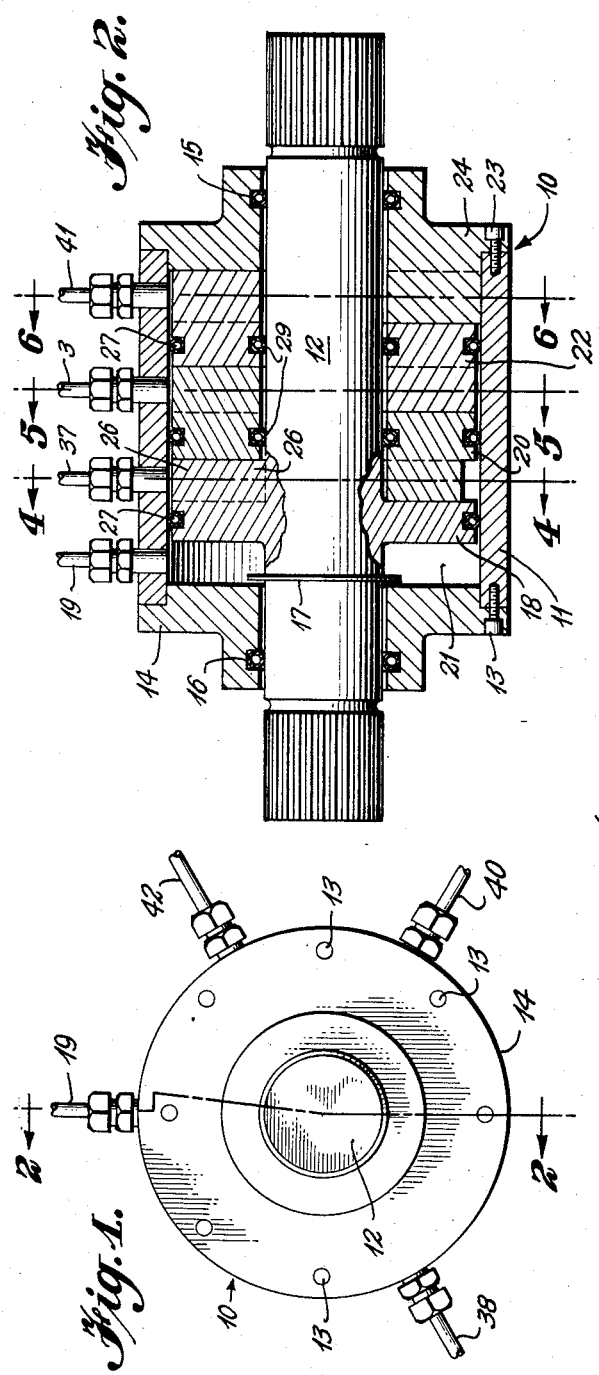
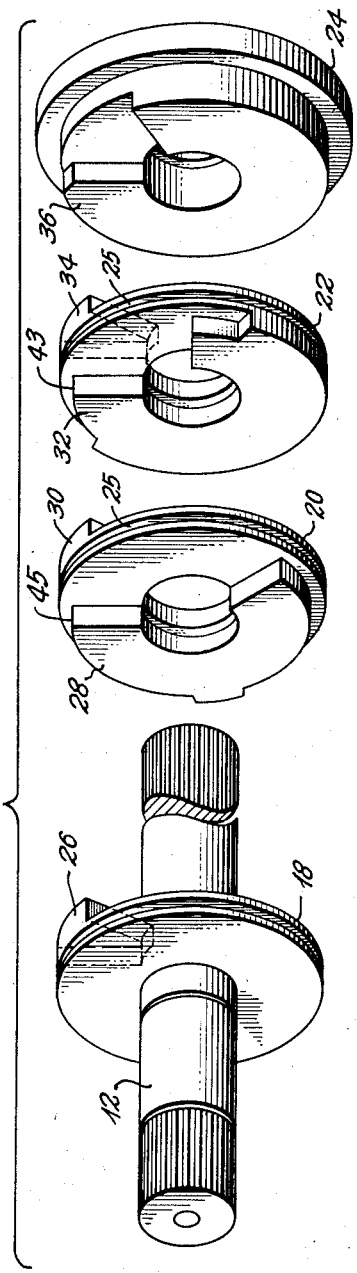
INVENTOR
Joseph E. Smith, Jr.
BY *Sughrue, Rothwell, Mion and Zinn*
ATTORNEYS Nov. 10, 1959 J. E. SMITH, JR 2,911,956
SHAFT POSITIONER
Filed Jan. 7, 1959 2 Sheets-Sheet 2
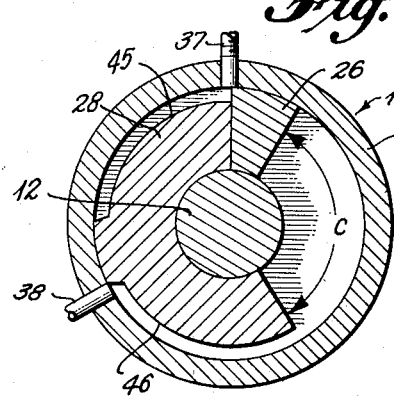
Fig. 4.
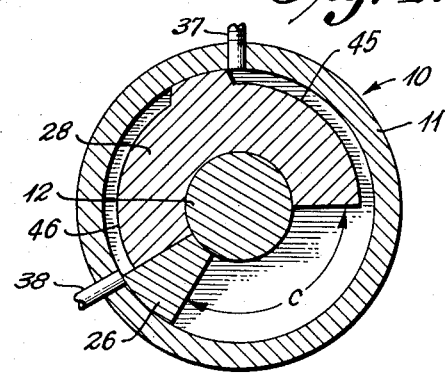
Fig. 4ᵃ.
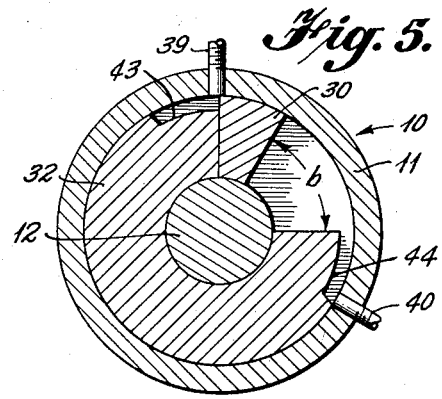
Fig. 5.
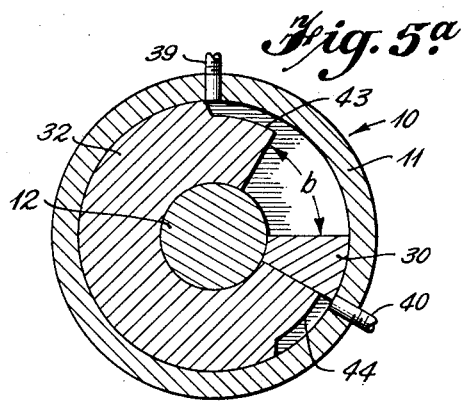
Fig. 5ᵃ.
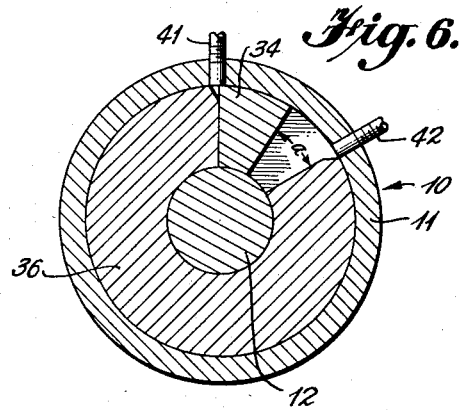
Fig. 6.
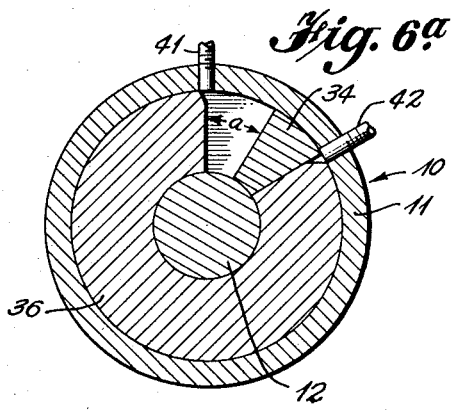
Fig. 6ᵃ.
INVENTOR
Joseph E. Smith, Jr.
BY Sughrue, Rothwell, Mion and Zinn
ATTORNEYS United States Patent Office 2,911,956
Patented Nov. 10, 1959

2,911,956

SHAFT POSITIONER

Joseph Earl Smith, Jr., Springfield, Vt., assignor to Bryant Chucking Grinder Company, Springfield, Vt.

Application January 7, 1959, Serial No. 785,489

8 Claims. (Cl. 121—98)

This invention relates to improvements in shaft positioners, and more particularly relates to apparatus for angularly positioning a shaft by fluid means in response to selective input signals.

In the arts of data processing, automation, and the like, there exists a need for devices which will accurately position a shaft in response to input information applied thereto. Various devices of this nature have been proposed; however, they are for the most part primarily electrically operated and this electrical operation gives rise to certain inherent difficulties. Accordingly, it is an object of this invention to provide an angular shaft positioner which is selectively operated by a plurality of fluid motor means.

The transmission of information in various information handling systems is commonly carried out in the binary numerical system. It is frequently desirable to convert the digital representation of the binary number into an analogue equivalent such as by angular shaft rotation. It is therefore another object of this invention to provide selectively operable fluid motor means for converting binary information into an analogue equivalent in the form of shaft rotation by fluid motor means.

It is a further object of this invention to provide a compact, self contained, vane type fluid motor powered binary to shaft position converter.

Additional objects and advantages of this invention will be pointed out in the following detailed description and claims and illustrated in the accompanying drawings, which disclose, by way of example, the principles of this invention and the best mode which has been contemplated of applying these principles.

In the drawings:

Fig. 1 is an end elevation view of a fluid motor type shaft positioner embodying the principles of this invention.

Fig. 2 is a sectional elevation view taken along line 2—2 of Fig. 1.

Fig. 3 is an exploded perspective view illustrating the component parts of the several fluid motors.

Fig. 4 is a sectional view along line 4—4 of Fig. 2 with the fluid motor positioning elements in one position.

Fig. 4a is a sectional line along line 4—4 of Fig. 2 with the fluid motor elements shown in another position.

Fig. 5 is a sectional view taken along line 5—5 of Fig. 2 with the fluid motor elements in one position.

Fig. 5a is a sectional view taken along line 5—5 of Fig. 2 with the fluid motor elements in another position.

Fig. 6 is a sectional view taken along line 6—6 of Fig. 2 showing the fluid motor elements in one position.

Fig. 6a is a sectional view taken along line 6—6 of Fig. 2 showing the fluid motor elements in another position.

In general, this invention includes a stationary housing having a portion of one fluid motor integrally attached thereto for furnishing a ground or reference position. An output shaft which is designed to be selectively positioned is journaled in the housing and a portion of another fluid motor opposite the reference position motor is integral with the output shaft. Other fluid motors may be disposed between the fluid motor referenced to the housing and the fluid motor attached to the output shaft. Fluid conduits which may function as inlets or outlets are connected to the fluid motors to selectively apply fluid to rotate the motors. The fluid motors are interconnected so that movement of any one of them will rotate the output shaft. In the preferred embodiment illustrated, the individual fluid motors, which are arranged in cascaded stages, are allowed a movement which is twice the movement of the preceding stage, whereby the fluid pressure applied to the individual motors, if according to a binary number, will thereby cause the output shaft to be positioned to an analogue equivalent of the decimal value of the binary number.

Referring to the drawings, a housing indicated generally at 10, journals an output shaft 12 which is designed to be selectively angularly positioned. The housing 10 includes a cylindrical shell 11 and an end cap 14 which is secured to the shell by screws 13. The opposite end of the housing 10 is closed by an end cap 24 which is secured to the cylindrical shell 11 by suitable screws 23. The end cap 24 furnishes the ground or reference for selectively positioning the output shaft 12 as will be described hereinafter.

Suitable seals 15 and 16 are provided within end caps 24 and 14 respectively, to seal the interior of housing 10 from the ambient. A suitable snap ring 17 is provided on the shaft 12 adjacent the inside of end cap 14 to prevent shaft 12 from actually moving to the left from the position shown in Fig. 2.

A fluid inlet conduit 19 is provided in fluid communication with space 21 to thereby continuously bias the output shaft 12 to the right as shown in Fig. 2. The output shaft 12 has an integral flange 18 thereon against which pressure admitted through conduit 19 acts. This flange also provides a fluid motor stage corresponding to the most significant digit of a binary number as will be explained hereinafter.

As shown in Figs. 2 and 3, in addition to the most significant digit stage fluid motor flange 18, there is also an intermediate digit stage fluid motor disc 20 and a least significant digit stage fluid motor disc 22. Each of these stage flanges is provided with a peripheral depression 25 for holding suitable O ring seals 27 to seal the stages from each other at the outside thereof. Additional seals 29 are provided at the inner periphery of the annular stages, as shown in Fig. 2. Stage discs 20 and 22 are freely rotatable on the output shaft 12 for purposes that will be described hereinafter.

As shown in Fig. 3, stage disc 20 has an abutment portion 28 on the side thereof adjacent a vane 26 on flange 18. On the other side of disc 20 is a vane portion 30. Rotatable digit stage disc 22 likewise has an abutment stage 32 on the same side as vane 30 and has a vane member 34 on the opposite side thereof. The end cap 24 which functions as the reference or ground also contains an abutment portion 36 for limiting the rotational movement of vane 34.

In addition to fluid pressure conduit 19, a number of other fluid conduits are secured to the housing 10 to supply fluid pressure or exhaust fluid pressure from the various stages of the fluid motors. These conduits are shown in Figs. 1, 2, 4, 5 and 6. The fluid motor including abutment portion 28 and vane 26 includes pressure or exhaust conduits 37 and 38 and fluid communication therewith. In a similar manner, the fluid motor including vane 30 and abutment 32 has a pair of fluid pressure conduits 39 and 40 in fluid communication therewith. The fluid motor including abutment 36 and vane 34 has fluid conduits 41 and 42 for supplying or exhausting fluid pressure thereto.

As shown in Fig. 6, the space between abutment 36 and the width of vane 34 is such that the vane 34 and the least significant digit stage disc 22 may move through an angle $a$ when pressure is supplied to conduit 41 and exhausted from conduit 42. Likewise, the distance between abutment 32 and the width of vane 30 is such that the amount of movement of vane 30 from one limiting position within abutment 32 to the other position is an angular distance called $b$. Angular distance $b$ is chosen to be twice angular distance $a$. Also, the distance between the edges of abutment 28 and the width of vane 26 is chosen such that movement of vane 26 to either of its extreme positions will cover an angle $c$. Angle $c$ is two times angle $b$ and therefore four times the value of angle $a$.

Abutment 32 carried by disc 22 must be relieved at 43 and 44 so as not to block conduits 39 and 40 upon movement of disc 22 through angular distance $a$ by vane 34. In a similar manner abutment 28 must be relieved at 45 and 46 such that flange 18 may move through an angular distance equal to $a+b$ in either direction with blocking conduits 37 or 38.

The operation of the device will now be described. Referring to Figs. 4, 5 and 6, fluid pressure is applied in each of the stages through conduits 38, 40 and 42 and exhausted through conduits 37, 39 and 41; thus vanes 26, 30 and 34 will be forced to a position against corresponding abutments and this position will be as shown in these figures. This position may be arbitrarily chosen to be position 0 which is equivalent to binary 000. Figs. 4a, 5a and 6a show the elements in a position that may be chosen to be position 7 (binary 111). Referring to these figures, fluid pressure has been applied through conduits 37, 39 and 41, and exhausted through conduits 38, 40 and 42. Referring to Fig. 6a, this causes vane 34 to take its opposite position against the other side of abutment 36. Movement of vane 34 causes movement of abutment 32 which is likewise carried on disc 22. Then when fluid pressure is applied through line 39, vane 30 moves to its other extreme position as shown in Fig. 5a, and causes abutment 28 to likewise move as shown in Fig. 4a. With abutment 28 moved to its position shown in Fig. 4a and fluid pressure applied through line 37, vane 26 will assume its position against the opposite side of abutment 28 and since vane 26 is integral with flange 18 and hence secured to output shaft 12, output shaft 12 will be rotated to its most extreme position which is an analogue equivalent of binary 111. It can thus be seen that by selectively applying fluid pressure to any of the inlet or outlet conduits any of the vanes may be selectively moved to thereby move the output shaft to its analogue equivalent. For example, assuming it were desired to move the shaft 12 to position 5, binary 101, then fluid pressure would be applied to fluid conduits 37, 40 and 41 and exhausted from conduits 38, 39 and 42. This would cause vanes 26 and 34 to move output shaft 12 through angular distance $a+c$. Vane 34 carries disc 22 and abutment 32 through angle $a$. This movement also carries disc 20 and abutment 28 through angle $a$ since vane 30 will be biased against the edge of abutment 32. Then movement of vane 26 to the opposite edge of abutment 28 will carry output shaft 12 through angle $a+c$. This will position the shaft to the select amount, i.e., an analogue equivalent of the binary number 5.

Although only three digit stages have been shown and illustrated, for the sake of simplicity and explanation and teaching one skilled in the art, it will be obvious that additional stages can be added as desired. Furthermore, various units can be selectively geared together to provide still additional stages. In the illustrated embodiment the most significant digit stage was connected to the output shaft and the least significant digit stage was connected to the stationary reference; it is obvious that this arrangement could be reversed.

Thus, while there have been shown and described and pointed out the fundamental novel features of the invention as applied to the preferred embodiment, it will be understood that various omissions and substitutions and changes in the form and details of the device illustrated and its operation may be made by those skilled in the art without departing from the spirit of the invention. It is the intention, therefore, to be limited only as indicated by the scope of the following claims and reasonable equivalents thereof.

What is claimed is:

1. A shaft positioner for angularly positioning an output shaft, said positioner comprising: a stationary enclosed cylindrical support housing, an output shaft rotatably journaled in the housing, a plurality of cascaded fluid motor driver stages journaled in the support housing, each of the driver stages including a driving member and a driven member, a disc carrying the driven member of each stage and supporting the driving member of the preceding stage, means on the driven member of each stage for limiting the angular movement of the driving member of each of the preceding driver stages, means connecting the driven member of an end stage to the output shaft, means on the stationary housing limiting the movement of the driving member of an opposite end stage, means admitting fluid pressure into the housing between the driving member and the means on the driven member limiting the angular movement of the driving member of each stage to power each stage and thereby selectively position the output shaft.

2. A shaft positioner as defined in claim 1 wherein the means limiting the movement of the driving members for each stage allow the driving members of each stage to move twice the angular distance of the preceding driver stage.

3. A shaft positioner for angularly positioning an output shaft, the positioner comprising: an enclosed stationary cylindrical support housing, an output shaft rotatably journaled in the housing, a flange secured to the output shaft, a vane extending axially from a radial face of the flange, a plurality of discs freely rotatable on said output shaft within said housing, each of said discs having projections axially extending from both radial faces thereof, the projection on one radial face constituting an abutment and the projection on the opposite radial face constituting a driving vane of adjacent fluid motors, means on one end of the stationary housing defining stationary abutment limiting the movement of an adjacent vane carried by an adjacent disc journaled on the output shaft, the plurality of discs being positioned between the vane on the flange on the output shaft and the stationary end housing having the abutment, and means for admitting fluid pressure selectively to either side of the vanes of each freely rotatable disc to selectively move the disc through the angle of movement allowed the disc by the corresponding abutments.

4. A shaft positioner for angularly positioning a shaft, the analogue equivalent of a binary number, the positioner comprising: an enclosed stationary cylindrical support housing, an abutment defining means on the inside of one end of the housing, an output shaft rotatably journaled in the housing, a flange on the output shaft within the housing, a vane extending axially from a radial face of the flange toward the abutment defining means on the end of the housing, a plurality of discs freely rotatable within the housing and on the output shaft between the radial flange on the output shaft and the end of the housing having abutment defining means, axially extending projections on each radial face of each disc, the projection on one face defining abutments and the projection on the opposite face defining a vane, the vane of an end disc cooperating with the abutment defining means of the end of the cylindrical housing and the abutments on the opposite end disc cooperating with the axially extending vane on the radial face of the flange of the output shaft, fluid conduits extending through the housing and establishing fluid communication with each side of each vane, whereby fluid pressure may be selectively supplied or exhausted to either side of any vane to selectively power the output shaft through any desired angle limited by the abutments of the fluid-powered stages.

5. A device as defined in claim 4 wherein the abutments allow the vanes of the corresponding fluid motors to move a distance which is a factor of two times the movement of the next adjacent stage whereby the output shaft may be positioned the analogue equivalent of a binary number.

6. A device as defined in claim 5 further comprising means for supplying pressure within the cylindrical housing to the side of the flange on the output shaft opposite the side containing a driving vane, the fluid pressure tending to bias the output shaft toward the end-cap of the cylindrical housing containing the abutment defining means.

7. A shaft positioner as defined in claim 5 further comprising means defining relieved peripheries on the abutments of the freely rotatable disc, the peripheries relieved to the extent that the abutments may move in either direction an amount equivalent to the movement allowed the fluid driving vanes of all the preceding discs.

8. A shaft positioner as defined in claim 5 wherein the periphery of the flange on the output shaft and the periphery of each of the discs contains sealing means therein for sealing fluid pressure between adjacent fluid motors.

References Cited in the file of this patent

UNITED STATES PATENTS

| | | |
|---|---|---|
| 2,197,867 | Klement | Apr. 23, 1940 |
| 2,443,333 | Tucker | June 15, 1948 |